UNITED STATES PATENT OFFICE.

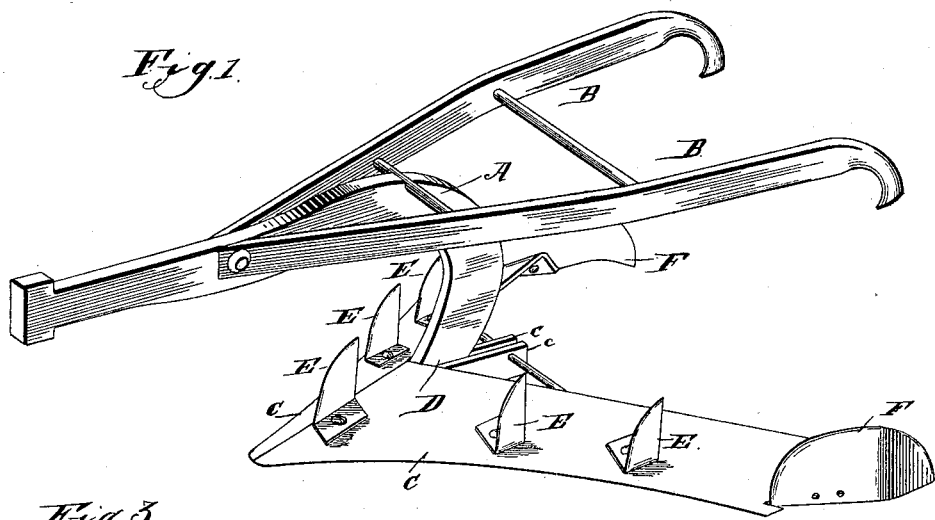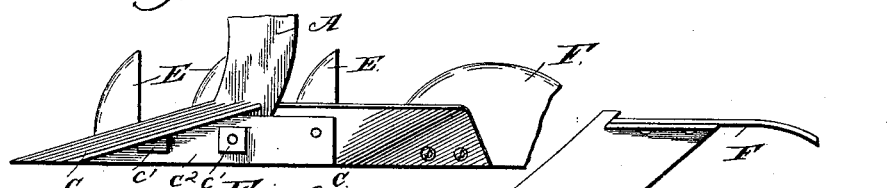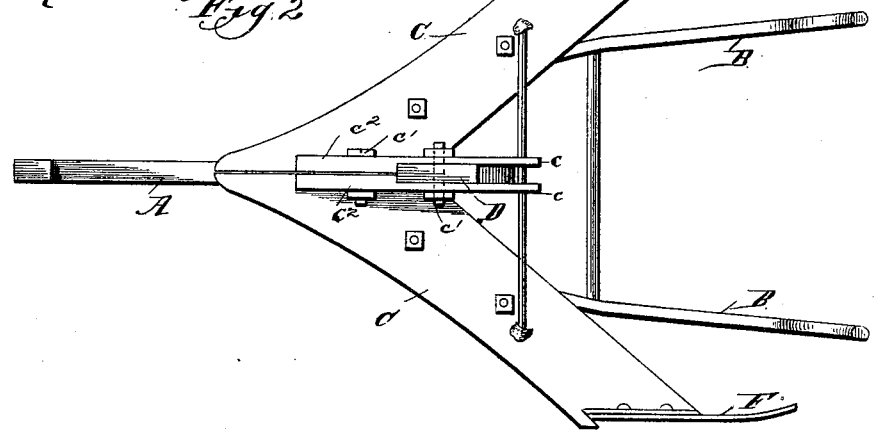

LE ROY McWHINNEY, OF CRESTON, IOWA.

PLOW.

SPECIFICATION forming part of Letters Patent No. 366,420, dated July 12, 1887.

Application filed February 24, 1887. Serial No. 228,745. (No model.)

*To all whom it may concern:*

Be it known that I, LE ROY McWHINNEY, a citizen of the United States, residing at Creston, in the county of Union and State of Iowa, have invented a new and useful Improvement in Plows, of which the following is a specification.

The invention relates to improvements in plows; and its object is to cut and pulverize the soil from a short distance below the surface upward, so as not to turn the same over and expose the ammonia and other fertilizing agents contained therein to the action of the atmosphere, by which they would be in part absorbed and the soil thereby weakened.

The invention consists in the combination, with a large V-shaped or double-bladed plowshare or colter, the edge of which is arranged to penetrate and run under the surface of the soil, of a number of vertical soil-cutting knives or blades rising from the upper surface of the same.

It consists, further, in certain details of construction and arrangement, hereinafter described, pointed out in the claims, and illustrated in the drawings, in which—

Figure 1 is a perspective view of the improved plow seen from the front. Fig. 2 is a reversed plan of the same, showing how the arms of the colters are connected. Fig. 3 is a sectional view.

Referring to the accompanying drawings, A designates the plow-beam, and B the handles attached thereto in the usual manner.

C C are the opposite and similar arms or blades of the large V-shaped share or colter, the point of which is in front, and $c\ c$ are vertical flanges standing downward from the meeting edges of said arms, and secured together by the nuts and bolts $c'$, as shown in Fig. 2. The free ends of said flanges are stayed by the rails $c^2\ c^2$, which run from each flange to the under surface of the corresponding arm, C.

D is the lower part of the plow-beam, secured between the flanges $c\ c$ by one of the bolts and nuts $c'$ immediately in the rear of the angle formed by the arms of the colter. The said colter inclines downward from its rear edge to its point and front edge, so that the said point and edge enter the soil and run thereunder.

E E are vertical blades standing from the upper surface of the colter at suitable points, and having their edges which are in front curved upward and backward, or convex, so as to cut the soil above the colter more easily than could be done by straight or concave edges.

F F are blades having convex cutting-surfaces, and secured to the bent-down rear ends of the arms C. The said blades have their rear ends bent inward, so as to throw the cut soil toward the middle line of the part of the ground worked by the plow, when the same is necessary.

Both the blades E and F are detachable, as it is sometimes desirable to run the plow so as to loosen up the surface of the soil without cutting the same.

In operation the broken and cut soil runs over the rear edge of the colter; but, if desired, the latter may be run entirely below the soil.

The plow is easily guided, requires little power, comparatively, to run it, and the blades may be extended on each side as far as desirable.

Having described my invention, I claim—

1. In a plow, the share having the rearward-diverging horizontal arms having their upper sides inclined downward to their front cutting-edges, the vertical knives or cutters F, secured to the outer ends of the arms and projecting rearward therefrom, and having their rear ends curved inward toward each other, and the vertical knives E, arranged at suitable distances apart on the intermediate portion of the arms, for the purpose set forth, substantially as described.

2. The herein-described plow, consisting of the beam A, the handles B B, the V-shaped share or colter C C, inclining downward from its front edge to its rear edge and point and provided with the flanges $c\ c$, the bolts and nuts $c'$, holding the said flanges together and the plow-beam to the flanges, the vertical knives E, having front cutting-edges, and the knives F, secured to the bent-down edges of the arms C of the colter and having their rear ends turned inward, all constructed and arranged substantially as and for the purpose set forth.

In testimony that I claim the foregoing as my own I have hereto affixed my signature in presence of two witnesses.

LE ROY McWHINNEY.

Witnesses:
J. B. HARSH,
B. BURCH.